A. HOWLAND.
PHOTOMETRIC DEVICE.
APPLICATION FILED APR. 27, 1914.
1,176,898.  
Patented Mar. 28, 1916.  
2 SHEETS—SHEET 1.
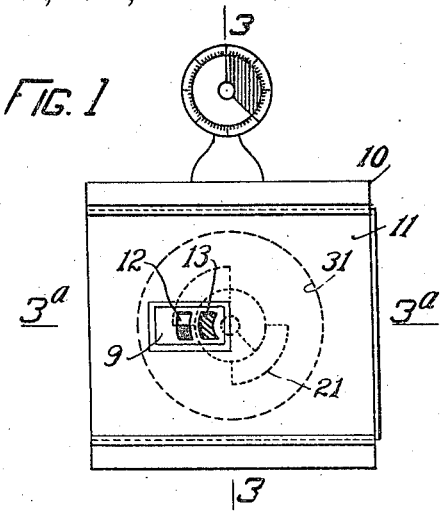
FIG. 1
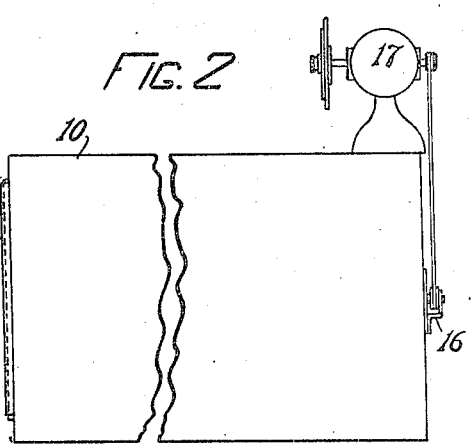
FIG. 2
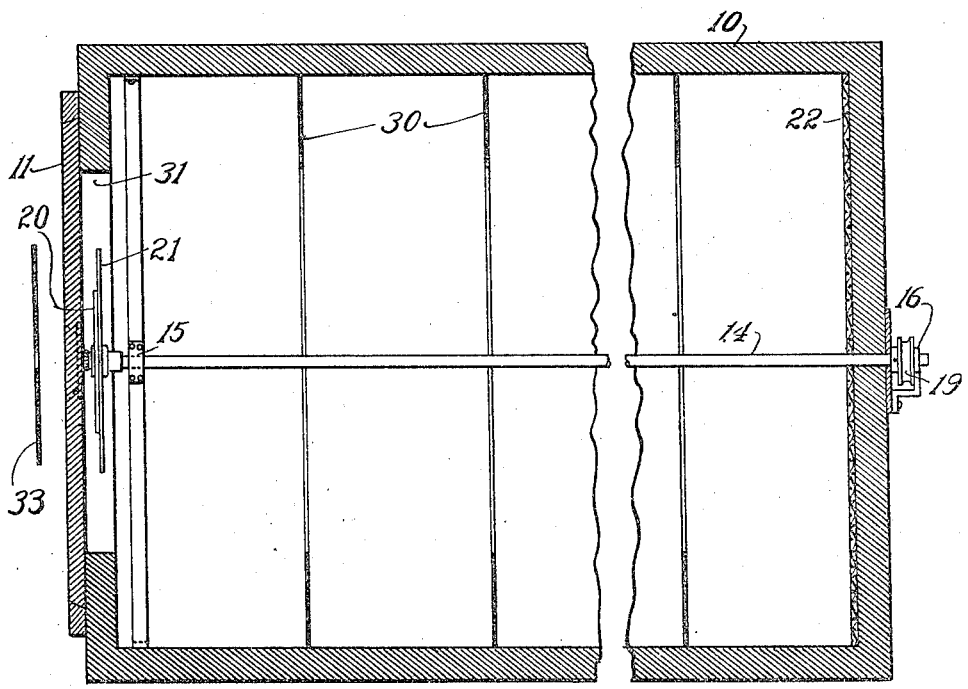
FIG. 3
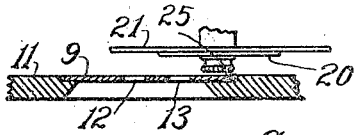
FIG. 3ᵃ
WITNESSES  
A. T. Palmer.  
Anna B. Lindsay.
INVENTOR  
Arthur Howland  
BY  
Mitchell, Chadwick  
& Kent  
ATT'YS A. HOWLAND.
PHOTOMETRIC DEVICE.
APPLICATION FILED APR. 27, 1914.
1,176,898.
Patented Mar. 28, 1916.
2 SHEETS—SHEET 2.
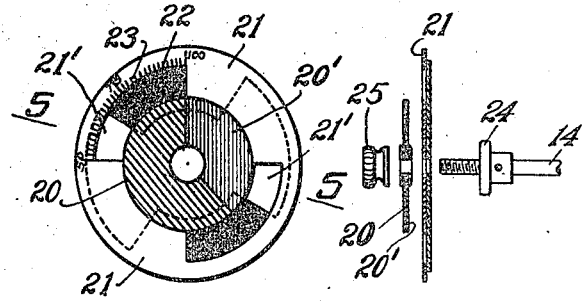
FIG. 4   FIG. 5   FIG. 6
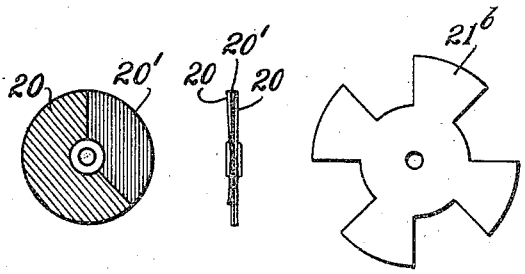 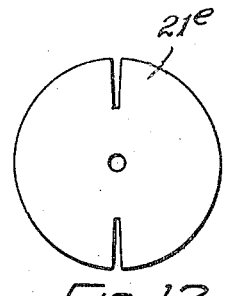
FIG. 8   FIG. 9   FIG. 7   FIG. 12
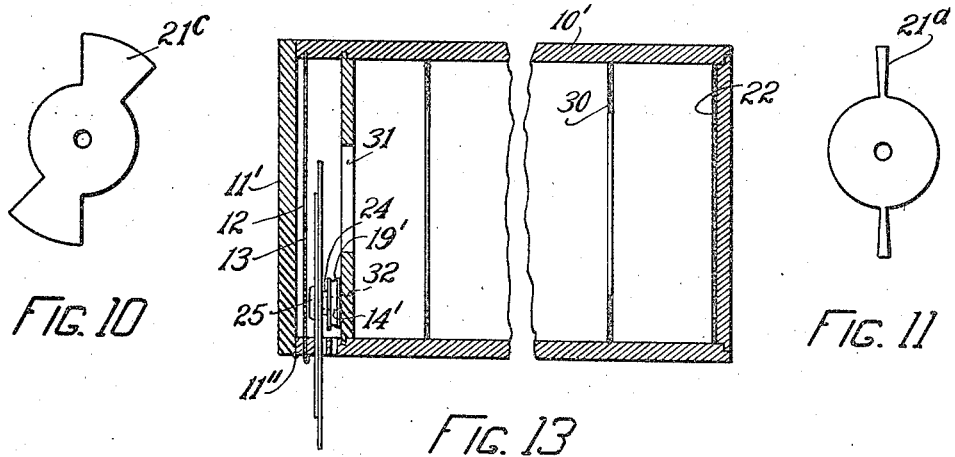
FIG. 10   FIG. 13   FIG. 11
WITNESSES
A. T. Palmer.
Anna B. Lindsay.
INVENTOR
Arthur Howland
BY Mitchell, Chadwick & Kent
ATTYS.

UNITED STATES PATENT OFFICE.

ARTHUR HOWLAND, OF WEST NEWTON, MASSACHUSETTS.

PHOTOMETRIC DEVICE.

1,176,898.  Specification of Letters Patent.  Patented Mar. 28, 1916.

Application filed April 27, 1914. Serial No. 834,573.

*To all whom it may concern:*

Be it known that I, ARTHUR HOWLAND, a citizen of the United States, residing at West Newton, in the county of Middlesex and State of Massachusetts, have invented new and useful Improvements in Photometric Devices, of which the following is a specification.

This invention relates to improvements in photometers.

More particularly it relates to apparatus for measuring the luminosity of a pigment or of a surface reflecting light; but it is applicable also to other more or less cognate purposes, as, for example, the comparison of pigments for measuring and testing hues and chroma.

With respect to measurements of luminosity, the object of the invention is to improve upon previously known apparatus in the accuracy of results obtainable, especially owing to the high degree of approximation of its standards to absolute correctness and the precision with which gradations between absolute black or a luminosity of zero, and absolute white or a luminosity of one hundred per cent., may be measured. The improvement in accuracy of standards results mainly from the new standards of black which the invention makes possible; and the improvement in precision of measurement from the method of measuring the ingredient proportions of colors or of black and white in any test sample or in any standard of luminosity for which the apparatus may be set.

The objects of the invention are attained by providing means to utilize, as a standard of black, a vista into space from which all light is excluded, and by providing means for mixing this black and a standard white or any color or colors in precisely measured proportions in the retina of the observer, by the spinning process; and further by providing means for the comparison of any standard gray of known value thus obtained, with a surface whose luminosity is to be tested, by ocular observation or otherwise under identical conditions of illumination. The invention provides means by which such a black, which approximates so closely to an absolute black that it may be considered such for all practical purposes, can be obtained under ordinary and conveniently observable conditions in a light room, as a laboratory, workshop or studio, by apparatus contained in a small and convenient compass. By varying the dimensions of the apparatus this approximate black, which is blacker than any black that has ever before been produced under conditions in which it can be mixed with white, so far as I am aware, can be refined further to any desired degree of approximation to the theoretical absolute black.

The invention is illustrated as it may be embodied in one form of apparatus, certain modifications of which are also shown, but the patent is not limited to the particular embodiments here illustrated; and it is intended to cover by the appended claims whatever features of patentable novelty exist in the invention disclosed.

In the accompanying drawings, which represent structures embodying the invention for general laboratory use, Figure 1 is a front end elevation of one form of apparatus; Fig. 2 is a side elevation; Fig. 3 is a side elevation on a larger scale in medial section, being on the line 3—3 of Fig. 1; Fig. 3ᵃ is a plan of a detail, in section on the level 3ᵃ—3ᵃ of Fig. 1, enlarged; Fig. 4 is a front elevation of a detail showing a portion of the apparatus by which various grays of determinate standard may be obtained, measured and placed for comparison with the test sample; Fig. 5 is a section on a plane perpendicular to the plane of Fig. 4, on the line 5—5 of Fig. 4, representing the parts separated from each other; Fig. 6 is a detail of another form of disk for producing a standard gray of known value; Fig. 7 is still another form of the same; Fig. 8 shows a front elevation, and Fig. 9 a side elevation of a pair of Maxwell disks whose joint effect or mixture is to be compared with the standard; Figs. 10, 11 and 12 represent disks for making standard grays of other degrees of luminosity; and Fig. 13 is a plan of a modification, in section.

Referring to the drawings, 10 represents a box which is light tight, except at the front end, and is preferably lined interiorly with black velvet, especially at its back 22. At the front end it is closed by a slide 11, giving access to a rather large opening 31 in the front end wall. As here represented the slide has two small observing apertures 12, 13, best seen in Figs. 1 and 3ᵃ. It will be understood that the dimensions of the box may be varied for different purposes, both as to its length, which determines the depth of vista; and as to its width, and as to the shape, number and dimensions of the openings 12, 13. In order to have a sufficient horizontal extent for an opening 12 of convenient length or a series of such openings 12 showing standard black, the box 10 may be about twelve inches wide; and I have found in practice that a box of twenty-six inches depth of vista is adequate. The proportions of the box represented in the drawing are somewhat distorted for lack of space. Interiorly any suitable means such as black, light absorbing vanes 30 are provided for guarding the back surface or end of the vista 22 from illumination by rays entering through the openings 12 or 13.

In using the apparatus under studio or laboratory conditions the box may be placed so that the observer faces the front end of it, as seen in Fig. 1, with a window behind him quartering to the left, and another behind him quartering to the right, so that any rays of light entering directly from the window through the opening 12 pass through obliquely, and impinge first upon the sides of the box or vanes 30, by which they are absorbed or reflected backward and forward, to and fro, until finally they are lost among them or on the edge portions of the back 22. The field toward which the observer looks perpendicularly, is, preferably, a part of the back 22 somewhat removed from its edges, and from the shaft 14, if there be such a shaft in the box. In work requiring exceptional accuracy, rays of light that may enter perpendicularly to the rear wall 22 may be screened as represented (diagrammatically) at 33, Fig. 3, so that practically no rays can enter the box except those which arrive obliquely. If any of these should reach the back they would strike it at such an angle that they would not be reflected perpendicularly thence to the eye of the observer.

In the form illustrated in Figs. 1, 2 and 3, a shaft or axle 14 runs longitudinally through the box, being journaled in suitable bearings 15 at the front and 16 at the rear. In a box of the dimensions stated I have found that with the apertures 12 and 13 wide open only a fraction of the length of the shaft is visible, the rear portion being invisible for lack of illumination; and that any pigment placed against the back surface 22 is absolutely invisible under the circumstances stated. The presence of the shaft 14 therefore incidentally affords a convenient test as to the tightness of the box, for if the shaft should become visible it would indicate the entrance of light in some improper manner. The shaft is arranged to be rotated by any suitable means, here represented as being by a belt running over pulley 19 outside of the box and driven by an electric motor 17. The forward end of the shaft is adapted to hold and spin the test specimen whose luminosity is to be measured, represented in this case as a pair of Maxwell disks 20, 20', and a white component of the standard of luminosity, the test specimen being observed through the opening 13 and the latter through the opening 12. For the more convenient adaptation of the apparatus to different purposes the openings 12, 13 are preferably arranged in a thin removable plate 9 for which other plates may be substituted with holes of other shape or dimension, or with a single hole in place of the two.

The specimen may be either a solid color, or any combination of colors, arranged in any proportions, and including if desired a known proportion of the standard white or of the standard black of the vista, or both. The Maxwell disks represented are shown as being mounted by any suitable means on the end of the shaft 14. When the shaft is rotated at a high speed the observer looking through the opening 13 will see the mixture of these colors, which for present purposes may be assumed to be a neutral gray. The standard with which the specimen is to be compared appears through the opening 12. It consists of a mixture of the spinning white of the disk 21, with the stationary black of the vista which is indicated in the drawing by the reference numeral 22 applied to the black velvet back end of the box from which all light that can be reflected to the eye is excluded. Any suitable standard white pigment may be used. Carbonate of magnesia is found suitable for all ordinary purposes; but any pigment having a mat or dead reflecting surface that will serve better as a standard pigment of perfect luminosity may be used if such ever becomes known. Sectors of this disk 21 are excised, and through the excisions the black of the vista is exposed. Preferably these excisions are balanced so that the disk will rotate evenly. The luminosity of the composite standard depends upon the proportion of the white disk left remaining, a complete white disk, having no excised portion, being taken as having a luminosity of 100%. A disk whose white sectors cover 180 degrees of its circumference will have 50% luminosity; and disks whose sectors are of other proportions have a luminosity precisely proportional to the angular area of white present for observation. This is because that white area constitutes the entire luminosity of the standard, the part excised being replaced, under observation, by the black of the vista 22, whose luminosity is so close to absolute zero that the error can be neglected without appreciable impairment of the accuracy of the standards obtained while so doing. This black is, indeed, so free from luminosity that the black rotating cards heretofore used as standards of black on the principle of Maxwall disks, are, when subjected to the test of the apparatus of the invention, seen to be distinctly luminous. Fig. 6 illustrates such a white disk 21ª of 50% standard, and Fig. 7 illustrates another form of disk 21ᵇ of 50% standard, while Fig. 10 represents a disk 21ᶜ of 25% standard, Fig. 11 a disk 21ᵈ of 1% standard and Fig. 12 a disk 21ᵉ of 99% standard. Fig. 4 illustrates a means by which the luminosity of the standard may be changed, and its precise luminosity read by a scale. In this case a circular scale 23 is arranged as a part of the disk, and the entire possible circumferential extent of the disk is divided into four portions, two opposite quadrants 21, 21 being integral with the scale with quadrant excised spaces between them; and the remaining two quadrants 21', 21' being on a separate disk which can be adjusted either to coincide with said quadrants 21 or to completely fill the spaces between them, or to overlap the edges of the said quadrants and to project partly over the intervening spaces, beside the scale, as illustrated in Fig. 4, to any desired degree. In all such positions the parts are perfectly balanced about the axle 14. The manner of fastening the parts on the axle in any relation to each other is clearly shown in Fig. 5 where the shoulder 24, against which they may be clamped by the screw nut 25, is seen. These parts are accessible for adjustment when the slide 11 is removed. When the disk 21' has been set so that the grays seen through the openings 12, 13 are the same the position of the disk 21' on the scale 23 will indicate the luminosity. Any suitable means may however be employed to determine the proportions of white and black area in the spinning standard, and this proportion is the luminosity. The elements of distance, intensity, size of opening for admitting light, diffusion errors for different degrees of value, etc., do not require consideration nor produce any effect upon the accuracy of the instrument, for the standard and the test specimen are compared under identical conditions in those respects being close beside each other and subject to the same illumination by diffused daylight, whether that be bright or dim.

In Fig. 13 is shown an arrangement in which the axle does not enter the box at all. In this case the box 10' has a front end wall on which is an external bracket 32 carrying a very short shaft 14' which projects forward, there being a pulley 19' for driving the shaft and a shoulder and nut 24, 25, for holding the disks thereon; and the parts are so placed that the disks project laterally to positions forward of the hole 31 in the front wall. The side walls of the box project still farther forward to support a door 11', capable of closing the front end of the box, to which it is hinged at 11''. Back of this door, and covering the hole 31, is a thin slide having the observation holes 12, 13, close in front of the position where the disks spin. In this case the vista to the back surface 22 is provided as before whenever the door 11' is open. The motor may be mounted above or beside the box in any convenient location, or, as in the other case, some different means of turning the disks may be employed. In either of these styles of construction, and particularly in the smaller sizes, the box may take the form of a tube, which, for portability and convenience, may be only three or four inches in diameter and may be materially shorter than an instrument having wider openings for observation. When a motor is used for spinning the disks another adjacent shaft, to wit, the motor shaft, becomes available for spinning disks to mix colors that may be compared simultaneously with the standard, as is indicated by the Maxwell disks and scale portrayed at 20'' in Figs. 1 and 2.

The opening 13 is represented as being fully covered by the test specimen, but it will be obvious that the test specimen might be arranged with excisions so that the black would be mixed with it in any desired proportion, and that many other variations from the precise form and arrangement chosen to illustrate the invention might be made. In particular it may be observed that the limitations of the drawing have led to the screen 33 being represented altogether too close to the box. It would naturally be larger, more remote, and would not limit the rays that pass it to illuminate the apertures 12, 13, to rays of such extreme obliquity as represented. For all ordinary work this screen can be omitted without appreciably impairing the accuracy of the apparatus; and this ability of the apparatus to work under general daylight conditions is one of its advantages. It will also be understood that although the arrangement of apparatus chosen for illustration shows only a white pigment arranged for spinning with the black, any color or any combination of colors may be substituted for the white, either to make a standard, or for purposes of experiment, test, or comparison; and that by using suitable dimensions in designing the spinning part and the excisions therein, and the plate 9 and the slide 11, the black can be introduced as an element in the mixture anywhere in the field of observation.

In the claims the term "pigment" is used in a broad sense to signify any kind of surface, reflecting light of any color, including surfaces ordinarily called white, gray or black; and the term "spinning" which is the name of one of the most convenient means of mixing colors in the retina of the eye, is used in a somewhat generic sense, as any other means of presenting a rapid repetition of color impressions to the eye would naturally be its equivalent.

I claim as my invention:

1. Photometric apparatus comprising means to form a vista from which light is excluded, whereby an appearance of black is created; a pigment of maximum luminosity having a measurable extent, arranged between the vista and the point of observation, spinning with measurable intervals through which said black of the vista appears, whereby a standard gray appearance of known luminous value is obtained; and means to hold another colored body adjacent thereto under identical conditions of illumination.

2. Photometric apparatus comprising means to form a vista from which light is excluded, whereby an appearance of black is created; means to spin a known extent of pigment between the vista and the point of observation, with measurable intervals through which said black of the vista appears, whereby a known proportion of black is mixed with the pigment; and means to spin another pigment for comparison, adjacent to the first under identical conditions of illumination.

3. Photometric apparatus comprising an inclosure having means to exclude all light except at one end, there being at said end an opening for observation; means interiorly on the sides of the inclosure to prevent light which enters obliquely through said opening from being reflected by the farther end of the box in the line of observation, whereby said end is in a vista having an observed luminosity approximating zero in value; and means to spin a pigment past said opening with intervals through which the black of the vista appears, thereby mixing the effect of said black and pigment.

4. Photometric apparatus comprising a relatively long and narrow inclosure having means to exclude light except at one end, said end having an opening for an observer; means to prevent light entering there from being reflected to the observer; an axle, and pigment disks adapted to be spun thereon, one of the disks having an excision passing said opening.

5. Photometric apparatus comprising a relatively long and narrow inclosure having means to exclude light except at one end, said end having an opening for an observer; the opposite end being covered with black material, and the sides having transversely-extending, light-interrupting vanes; an axle extending in the longitudinal direction, and means to hold pigments thereon for spinning past said opening, with intervals through which the luminosity of the opposite end appears, the surface of the said opposite end being substantially perpendicular to the line of observation.

6. Photometric apparatus comprising relatively long and narrow inclosure having means to exclude light except at one end said end having an opening for an observer means to prevent light rays entering obliquely through said opening from reaching the other end; means to screen said opening from light rays that might enter in the longitudinal direction; an excised pigment disk and means to spin it past said opening and means to hold another pigment adjacent for comparison, both pigments being similarly illuminated by oblique rays.

7. Photometric apparatus comprising means to form a vista from which light is excluded, whereby an appearance of black is created; a spinning disk arranged between the vista and the point of observation, having an excision through which the black of the vista may appear; another disk adapted to overlie the first and cover to various degrees the excision of the first, and a scale indicating the degree of such overlying.

8. Photometric apparatus comprising stationary means displaying a standard black combined with a spinning pigment having intervals through which the black appears and is mixed as by spinning, and means to hold another colored body adjacent thereto under identical conditions of illumination.

9. Photometric apparatus comprising stationary means displaying a color effect, an axle and a pigment disk adapted to be spun thereon, arranged adjacent and having an excision of measurable extent through which the said color effect may pass to the eye of the observer and thereby appear mixed with the pigment in known proportion, and means to hold another colored body adjacent thereto under identical conditions of illumination.

10. Photometric apparatus comprising stationary means displaying a standard black, an axle and means for holding thereon a plurality of pigment spinning disks exposed at different distances from the axis, including one having an excision through which the stationary black may appear, whereby a mixture of the stationary black and the pigment of the disk may be compared with an adjacent disk or mixture under similar conditions.

11. Photometric apparatus comprising means to form a vista from which light is excluded, whereby an appearance of black is created; a screen at the entrance to said vista having an aperture, a pigment disk having an excision, and means to spin it by the aperture, conjunction of the aperture and the excision introducing the black of the vista as an element mixed with the pigment over the area of the aperture.

12. Photometric apparatus comprising means to form a vista from which light is excluded, whereby an appearance of black is created; an apertured screen at the entrance to said vista; means to spin a plurality of disks adjacent thereto, under equal conditions of illumination, one or more having excisions registering with the aperture, whereby the said black is mixed with the pigments thereon.

13. Apparatus for making colors of determinate luminosity, comprising the provision of an observable field from which approximately all light is excluded; and means to substitute an illuminated pigment of predetermined luminosity for said field in the line of observation, for brief intervals with rapid repetition, during a determinate proportion of the time of observation.

14. Apparatus for making colors comprising the provision of a stationary field of determinate color quality and means to move another field of different determinate color quality across the line of observation of the first field with rapid repetition at intervals whose duration bears a determinate ratio to the duration of the crossing.

15. Apparatus for making colors comprising the provision of a field of determinate color quality and means to rotate another field of different color quality across the line of observation of the first field, the second field being arranged symmetrically with respect to the center of rotation.

16. Apparatus for making colors comprising the provision of means to rotate a color field about an axis; means to hold separate colors composing the field, each color in the field being arranged in a plurality of portions symmetrical with respect to the center of rotation whereby the body rotates in balance.

17. Photometric apparatus comprising an inclosure having means to exclude light except at one end, said end having an opening for an observer and the inclosure being long in depth from the opening, relative to the size of the opening; an axle, and pigment disks adapted to be spun thereon, one of the disks having an excision passing said opening.

18. Photometric apparatus comprising means to form a vista from which light is excluded whereby an appearance of black is created; a screen at the entrance to said vista, there being an opening through the screen, exposing the vista; a pigment disk having an excision; means to spin the disk behind said screen and past said opening, the spinning disk being concealed by the screen, except at the opening, and the conjunction of the opening and the excision introducing the black of the vista as an element mixed with the pigment over the area of the opening.

Signed by me at Boston, Massachusetts.

ARTHUR HOWLAND.

Witnesses:
  ANNA B. LINDSAY,
  JOSEPH T. BRENNAN.